United States Patent
Siriwardane et al.

(10) Patent No.: US 9,523,499 B1
(45) Date of Patent: Dec. 20, 2016

(54) REGENERABLE MIXED COPPER-IRON-INERT SUPPORT OXYGEN CARRIERS FOR SOLID FUEL CHEMICAL LOOPING COMBUSTION PROCESS

(75) Inventors: Ranjani V. Siriwardane, Morgantown, WV (US); Hanjing Tian, Morgantown, WV (US)

(73) Assignee: U.S. Department of Energy, Washington, DC (US)

( * ) Notice: Subject to any disclaimer, the term of this patent is extended or adjusted under 35 U.S.C. 154(b) by 1018 days.

(21) Appl. No.: 13/159,553

(22) Filed: Jun. 14, 2011

(51) Int. Cl.
| F23C 5/00 | (2006.01) |
| F23M 3/02 | (2006.01) |
| F23D 14/22 | (2006.01) |
| F23D 14/32 | (2006.01) |

(52) U.S. Cl.
CPC ............ *F23D 14/22* (2013.01); *F23D 14/32* (2013.01); *Y02E 20/344* (2013.01)

(58) Field of Classification Search
CPC ........... F23C 13/08; F23C 10/18; F23C 13/00; B01J 19/00; B01D 53/62; B01D 53/1406; B01D 53/864; B01D 53/46; C01G 3/02; F23D 14/22; F23D 14/32; Y02E 20/344
USPC .......................... 431/8, 7; 423/652, 657, 659
See application file for complete search history.

(56) References Cited

U.S. PATENT DOCUMENTS

| 4,156,037 | A | * | 5/1979 | Hattori | H01F 41/14 |
| | | | | | 252/62.55 |
| 5,827,496 | A | * | 10/1998 | Lyon | 423/659 |
| 6,614,178 | B1 | * | 9/2003 | Okada | H01L 45/00 |
| | | | | | 257/E45.001 |
| 8,241,523 | B2 | * | 8/2012 | Apanel et al. | 252/373 |
| 8,470,276 | B1 | * | 6/2013 | Siriwardane | B01D 53/62 |
| | | | | | 423/220 |
| 9,004,911 | B1 | * | 4/2015 | Siriwardane | F23C 10/01 |
| | | | | | 423/224 |
| 2005/0175533 | A1 | * | 8/2005 | Thomas | C01B 3/063 |
| | | | | | 423/657 |
| 2005/0232859 | A1 | * | 10/2005 | Sanfilippo | C01B 3/063 |
| | | | | | 423/652 |
| 2007/0049489 | A1 | * | 3/2007 | Becue | B01J 8/10 |
| | | | | | 502/304 |

(Continued)

OTHER PUBLICATIONS

References as Wang et al. "Chemical looping combustion of coke oven gas" Shuzhong Wang et al. "Chemical looping combustion of coke oven gas by using Fe2O3/CuO with MgAl2O4 as oxygen carrier", Energy Environ. Sci. 2010, 3, 1353-1360.*

(Continued)

*Primary Examiner* — Avinash Savani
*Assistant Examiner* — George R Blum
(74) *Attorney, Agent, or Firm* — Jacob A. Heafner; Michael J. Dobbs; Brian J. Lally (57) ABSTRACT

The disclosure provides an oxygen carrier for a chemical looping cycle, such as the chemical looping combustion of solid carbonaceous fuels, such as coal, coke, coal and biomass char, and the like. The oxygen carrier is comprised of at least 24 weight % (wt %) CuO, at least 10 wt % Fe2O3, and an inert support, and is typically a calcine. The oxygen carrier exhibits a CuO crystalline structure and an absence of iron oxide crystalline structures under XRD crystallography, and provides an improved and sustained combustion reactivity in the temperature range of 600° C.-1000° C. particularly for solid fuels such as carbon and coal.

20 Claims, 4 Drawing Sheets

(56) References Cited

U.S. PATENT DOCUMENTS

| | | | |
|---|---|---|---|
| 2008/0134579 A1* | 6/2008 | Kulkarni | C10J 3/56 48/73 |
| 2009/0020405 A1* | 1/2009 | Fan et al. | 201/12 |
| 2010/0181539 A1* | 7/2010 | Apanel | B01J 8/0055 252/373 |
| 2011/0094226 A1* | 4/2011 | McHugh et al. | 60/645 |
| 2011/0117004 A1* | 5/2011 | Lamont et al. | 423/437.1 |
| 2011/0198861 A1* | 8/2011 | Jallais et al. | 290/1 R |
| 2012/0100055 A1* | 4/2012 | Weber | B01D 53/46 423/219 |
| 2013/0255550 A1* | 10/2013 | Ajhar et al. | 110/345 |
| 2013/0316292 A1* | 11/2013 | Siriwardane | F23C 13/08 431/7 |
| 2013/0323147 A1* | 12/2013 | Iijima et al. | 423/220 |
| 2015/0013575 A1* | 1/2015 | Yazdanpanah | C10J 3/482 110/229 |
| 2016/0061442 A1* | 3/2016 | Yazdanpanah | B01J 8/28 431/7 |

OTHER PUBLICATIONS

References as Wang et al. "Chemical looping combustion of coke oven gas" Shuzhong Wang et al. "Chemical looping combustion of coke oven gas by using Fe2O3/CuO with MgAl2O4 as oxygen carrier", Energy Environ. Sci. 2010, 3, 1353-1360.*

Marcus Johansson, Tobias Mattisson, and Ander Lyngfelt; "Investigation of Fe2O3 with MgAl2O4 for Chemical-Looping Combustion"; Ind. Eng. Chem. Res. 2004, 43, 6978-6987; published on web Sep. 25, 2004 http://pubs.acs.org/doi/pdf/10.1021/ie049813c.*

Marcus Johansson, Tobias Mattisson, and Ander Lyngfelt; "Investigation of Fe2O3 with MgAl2O4 for Chemical-Looping Combustion"; Ind. Eng. Chem. Res. 2004, 43, 6978-6987; published on web Sep. 25, 2004 http://pubs.acs.org/doi/pdf/10.1021/ie049813c.*

Wang et al. "Chemical looping combustion of cok oven gas by using Fe2O3/CuO with MgAl2O4 as oxygen Carrier"; Energy Environ. Sci., 2010, 3, 1253-1360; published Aug. 5, 2010.*

J Yu et al., "Analysis of the sorbent energy transfer system (SETS) for power generation and C02 capture", Advances in Environmental Research 7 (2003) 335-345.*

Shuzhong Wang et al., "Chemical looping combustion of coke oven gas by using Fe2O3/Cu0 with MgAl2O4 as oxygen carrier", Energy Environ. Sci., 2010, 3, 1353-1360.*

J Yu et al., "Analysis of the sorbent energy transfer system (SETS) for power generation and CO2 capture", Advances in Environmental Research 7 (2003) 335-345.

Shuzhong Wang et al., "Chemical looping combustion of coke oven gas by using Fe2O3/CuO with MgAl2O4 as oxygen carrier", Energy Environ. Sci., 2010, 3, 1353-1360.

* cited by examiner

REGENERABLE MIXED COPPER-IRON-INERT SUPPORT OXYGEN CARRIERS FOR SOLID FUEL CHEMICAL LOOPING COMBUSTION PROCESS

GOVERNMENT INTERESTS

The United States Government has rights in this invention pursuant to the employer-employee relationship of the Government to the inventors as U.S. Department of Energy employees and site-support contractors at the National Energy Technology Laboratory.

FIELD OF THE INVENTION

The disclosure provides a mixed metal-oxide oxygen carrier for use in processes utilizing oxygen, where the oxygen is supplied via a reduction of the oxygen carrier. The oxygen carrier is a CuO-rich copper-iron solid solution on an inert support. The oxygen carrier may be a calcine from a mixture of at least 24 weight % (wt %) CuO, at least 10 wt % $Fe_2O_3$, and the inert support. In chemical looping combustion applications, the oxygen carrier provides an improved and sustained combustion reactivity in the temperature range of 600° C.-1000° C. particularly for solid fuels such as coal, coke, coal and biomass char, and the like

BACKGROUND

Applications are known where metal-oxide oxygen carriers are utilized for the delivery of oxygen via reduction of the oxygen carrier. One such application which has been investigated extensively is chemical looping combustion. Chemical looping combustion systems generally utilize a fuel reactor, an air reactor, and a metal oxide oxygen carrier undergoing reduction in the fuel reactor and oxidation in the air reactor. The reduction in the fuel reactor is facilitated by close contact between a fuel and the oxygen carrier. The subsequent oxidation of the carrier in the air reactor is an exothermic process, and a stream of $N_2$ is exhausted from the air reactor and carries the heat of oxidation to an attached power generation island.

Chemical looping combustion cycles provide potentially significant advantages. The enhanced reversibility of the two redox reactions offers improved efficiencies over traditional single stage combustions, where the release of a fuel's energy occurs in a highly irreversible manner. Further, with appropriate oxygen carriers, both redox reactions can occur at relatively low temperatures, allowing a power station to more closely approach an ideal work output without exposing components to excessive working temperatures. Additionally, and significantly, chemical looping combustion can serve as an effective carbon capture technique. Of the two flue gas streams generated, one is comprised of atmospheric $N_2$ and residual $O_2$, but sensibly free of $CO_2$, while the second stream is comprised of $CO_2$ and $H_2O$, and contains almost all of the $CO_2$ generated by the system. It is relatively uncomplicated to remove the water vapor, leading to a stream of almost pure $CO_2$. For these reasons, chemical looping combustion systems have been extensively investigated. However, necessary characteristics of the oxygen carrier such as sufficient durability and reactivity have limited the success, particularly when the fuel utilized has been introduced to the fuel reactor as a solid such as carbon, coal, or biomass.

It is understood that high reactivity of the oxygen carrier is desired in chemical looping combustion systems in order to limit the solid inventories utilized in the various processes. Toward this end, Cu-based oxygen carriers have been extensively investigated for the combustion of both gaseous and solid fuels. Generally, Cu-based carriers possess a high reactivity for fuel combustion in chemical looping combustion systems, however their relatively low melting point has generated severe agglomeration problems in systems operating in the 600° C. to 1000° C. range. This is recognized as problematic in a reactor where solid particles are flowing, moving, and recirculating, and where particle agglomeration leads to reduced reactivity and a host of other potential operational problems. As a result, thus far, the agglomeration issue experienced with Cu-based carriers has limited their successful application in working environments despite the relatively high reactivities that would be otherwise afforded. For example, in an application using gaseous $CH_4$ as fuel, investigators have reported that severe agglomeration issues appear in oxygen carriers having greater than 20 wt % supported CuO regardless of preparation method, and that generally less than 17 wt % supported CuO is recommended to provide for satisfactory performance. See de Diego et al., "Impregnated $CuO/Al_2O_3$ Oxygen Carriers for Chemical-Looping Combustion: Avoiding Fluidized Bed Agglomeration", *Energy & Fuels* 19 (2005).

Because of these CuO limitations and because of relative availability, $Fe_2O_3$ as an oxygen carrier has also been extensively investigated. $Fe_2O_3$ generally has improved temperature stability over CuO, however the reactivity of $Fe_2O_3$ is significantly limited as compared to Cu-based oxygen carriers. Additionally, $Fe_2O_3$ requires relatively high temperatures as compared to CuO. These characteristics reduce overall system performance and increase the complexity of heat transfer requirements in a working system. It would be advantageous to formulate an oxygen carrier for use in chemical combustion systems where the higher reactivity of a Cu-based carrier could be utilized with mitigation of the agglomeration issues. It would be additionally advantageous if any such formulation preserved the temperature stability of $Fe_2O_3$ without the high temperature requirement of the $Fe_2O_3$ reducing reaction. Further, it would be advantageous if the oxygen carrier were effective for a chemical looping combustion process utilizing a solid carbonaceous fuel such as coal, coke, coal and biomass char, and the like.

Various CuO and $Fe_2O_3$ mixtures have been proposed in chemical looping combustion systems operating with gaseous fuels. See e.g. Yu et al., "Analysis of the sorbent energy transfer system (SETS) for power generation and $CO_2$ capture", *Advances in Environmental Research* 7 (2003); See also Wang et al., "Chemical looping combustion of coke oven gas by using $Fe_2O_3/CuO$ with $MgAl_2O_4$ as oxygen carrier", *Energy Environ. Sci.* 3 (2010). Yu et al. utilized a mixture of CuO and $Fe_2O_3$ in-situ to postulate a thermally neutral carrier and generated results based on thermodynamic calculations, treating the mixture's overall performance as the sum of heat contributions from individual CuO and $Fe_2O_3$ with expected performances. Such an approach fails to address the performance issues such as reactivity and agglomeration associated with CuO. Wang et al. combined CuO and $Fe_2O_3$ on an $MgAl_2O_4$ support and through calcination produced an oxygen carrier exhibiting a high concentration of iron oxide crystalline structures, with separated phases of CuO or $Fe_2O_3$. Agglomeration is improved, however sufficient reactivity required operation at the higher temperatures generally associated with $Fe_2O_3$ carriers. It would be advantageous to formulate an oxygen carrier combining CuO and $Fe_2O_3$ which exhibits CuO crystalline structure, in order to provide a uniform species for effective operation at the lower combustion peak temperatures of CuO carriers.

Further, evaluation of the CuO—$Fe_2O_3$ carriers discussed above and of oxygen carriers generally has been conducted using gaseous fuels, where the is fuel introduced into the fuel reactor as a reducing gas, and appropriate reaction between the oxygen carrier and the reducing gas becomes largely a function of facilitating germane thermodynamic conditions. However, in contrast to these gaseous fuel approaches, significant differences arise when utilizing a solid carbonaceous fuel such as coal, coke, coal and biomass char, and the like. The solid fuels generally enter as a solid composition and may undergo subsequent gasification, producing volatile gases, char, and other compounds. The particular oxygen carrier utilized in such an approach must be effective for oxygen donation under temperatures sufficient to generate char from the solid fuel and volatiles, and also be effective in facilitating the production of $CO_2$ from the resulting char. Further, the thermodynamic favorability of interactions between the oxygen carrier and any resulting ash must be considered, in order to provide for the effective separation of the oxygen carrier over a cyclic process. Additionally, the combustion of solid fuel with an oxygen carrier is generally an endothermic process requiring some variety of heat transfer to the fuel reactor. As a result, an oxygen carrier exhibiting lower peak combustion temperatures would be preferred in order to mitigate any parasitic losses arising from the endothermic reaction.

It would be advantageous to provide an oxygen carrier where the higher reactivity of a Cu-based carrier could be combined with the temperature stability of $Fe_2O_3$ for a chemical looping process utilizing a solid carbonaceous fuel such as coal, coke, coal and biomass char, and the like. It would be further advantageous if interactions between the oxygen carrier and any resulting ash were thermodynamically unfavorable, in order to facilitate more effective separation over a cyclic process. It would be further advantageous lower peak combustion temperatures resulted, in order to mitigate parasitic losses during long term operation.

Accordingly, it is an object of this disclosure to provide an oxygen carrier for use in a chemical looping cycle such as chemical looping combustion where the higher reactivity of Cu-based carriers can be utilized with a mitigation of agglomeration.

Further, it is an object of this disclosure to provide an oxygen carrier for use in a chemical looping cycle where the temperature stability of $Fe_2O_3$ is largely preserved without the attendant high temperature requirement of $Fe_2O_3$ oxygen carriers.

Further, it is an object of this disclosure to provide an oxygen carrier for use in a chemical looping cycle which combines CuO and $Fe_2O_3$ in a manner providing for reduced agglomeration and increased durability.

Further, it is an object of this disclosure to provide an oxygen carrier for use in a chemical looping cycle which combines CuO and $Fe_2O_3$ in a manner providing for a reduced peak combustion temperature, in order to mitigate parasitic losses during long term operation.

Further, it is an object of this disclosure to provide an oxygen carrier for use in a chemical looping combustion process utilizing a solid carbonaceous fuel, where the oxygen carrier is effective for oxygen donation under temperatures sufficient to generate char and facilitate the production of $CO_2$ from the resulting char.

Further, it is an object of this disclosure to provide an oxygen carrier for use in a chemical looping combustion process utilizing a solid carbonaceous fuel exhibiting the lower peak combustion temperatures of CuO, in order to mitigate any parasitic losses arising from the generally endothermic reaction experienced with solid fuels.

Further, it is an object of this disclosure to provide an oxygen carrier for use in a chemical looping combustion process utilizing a solid carbonaceous fuel where interactions between the oxygen carrier and the resulting ash thermodynamically unfavorable, in order to facilitate more effective separation over a cyclic process.

These and other objects, aspects, and advantages of the present disclosure will become better understood with reference to the accompanying description and claims.

SUMMARY

The disclosure provides an oxygen carrier having improved durability and reactivity over metal oxides currently used in the chemical looping combustion of solid carbonaceous fuels, such as coal, coke, coal and biomass char, and the like. The oxygen carrier is comprised of a combination of metal oxides providing for increased reactivity per unit weight and enhanced physical durability and reactivity during multiple cycling combustion-regeneration reactions.

The oxygen carrier is a CuO-rich copper-iron solid solution on an inert support. The oxygen carrier may be produced through calcinations of a mixture of comprised of at least 24 wt % CuO, at least 10 wt % $Fe_2O_3$, and an inert support, where the wt % is based on the weight of the CuO, the $Fe_2O_3$, and the inert support. The oxygen carrier exhibits a CuO crystalline structure without indicating an iron oxide crystalline structure. The oxygen carrier in these proportions and with this structure is reactive with solid fuels such as coal, coke, coal and biomass char, and the like with excellent efficiency and achieves appreciable combustion rates at relatively low temperatures. The oxygen carrier provides an improved and sustained combustion reactivity in the temperature range of 600° C.-1000° C. particularly for solid fuels such as carbon and coal.

The novel oxygen carrier of this disclosure provides for an optimum combination of CuO and $Fe_2O_3$ on an inert support so that reactivity and durability are significantly enhanced in the chemical looping combustion of solid fuels, such as coal, coke, coal and biomass char, and the like. The oxygen carrier effectively operates in an environment where the solid fuel enters a fuel reactor and may be subsequently gasified, producing volatile gases, char, and other compounds. The oxygen carrier is effective for oxygen donation under temperatures sufficient to generate char from a solid carbonaceous fuel, and is effective in facilitating the production of $CO_2$ from the resulting char. Further, the thermodynamic unfavorability of interactions between the oxygen carrier and any resulting ash provides for the effective separation of the oxygen carrier over a cyclic process. Additionally and significantly, the oxygen carrier provides reduced peak combustion temperatures and mitigates parasitic losses arising from the generally endothermic reaction between oxygen carriers and solid fuels while extending the lifetime of the oxygen carriers.

The reduced carrier may be subsequently oxidized by contacting the reduced carrier and an oxidizing gas such as air in an oxidizing reactor in the chemical looping combustion process. Transfer between the fuel reactor and the oxidizing reactor may be utilized to facilitate a cyclic process. An exhaust stream comprised of $CO_2$ and $H_2O$ may be withdrawn from the fuel reactor for sequestration or other purposes, and a heated gas stream may be withdrawn from the oxidizing reactor and sent to a power island for the generation of power.

Embodiments of the oxygen carrier disclosed are further demonstrated and described in the following description.

DETAILED DESCRIPTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide process for chemical looping combustion of a solid carbonaceous fuel utilizing an oxygen carrier comprised of a CuO-rich copper-iron solid solution.

The disclosure provides an oxygen carrier having improved durability and reactivity over metal oxides currently used in the chemical looping combustion of solid carbonaceous fuels, such as coal, coke, coal and biomass char, and the like. The oxygen carrier is comprised of a combination of metal oxides providing for increased reactivity per unit weight and enhanced physical durability and reactivity during multiple cycling combustion-regeneration reactions.

The oxygen carrier is a CuO-rich copper-iron solid solution on an inert support. The oxygen carrier may be generated through calcinations of a mixture of comprised of at least 24 wt % CuO, at least 10 wt % $Fe_2O_3$, and an inert support, where the wt % is based on the weight of the CuO, the $Fe_2O_3$, and the inert support. The oxygen carrier exhibits a CuO crystalline structure without indicating an iron oxide crystalline structure. The CuO-rich copper-iron solid solution forms an oxygen carrier where $Fe_2O_3$ is highly dispersed and adjacent with the CuO, greatly mitigating CuO agglomeration and generating excellent stability during the multiple cycle reaction tests. Further, the structure results in a lower reduction temperature for the oxygen carrier than that of pure $Fe_2O_3$.

The oxygen carrier is typically a calcine generated through calcination of a mixture of the CuO, the $Fe_2O_3$, and the inert support. In an embodiment, the inert support is alumina or bentonite. In a further embodiment, the oxygen carrier is comprised of 30 wt % or less alumina acting as an inert support. The CuO-rich copper-iron solid solution from these proportions is effective for use as an oxygen carrier in chemical looping combustion applications, as well as other applications whereby the transport of oxygen is facilitated through the reduction and subsequent re-oxidation of a metal oxide oxygen carrier. In particular, the oxygen carrier is effective for the combustion of solid carbonaceous fuels such as coal, coke, coal and biomass char, and the like with excellent efficiency, and achieves appreciable combustion rates at relatively low temperatures. Embodiments of the oxygen carrier have demonstrated 95% combustion of carbon at temperatures less than 800° C. even in the absence of steam, with combustion rates between 0.07-0.04 $min^{-1}$. The oxygen carrier provides an improved and sustained combustion reactivity in the temperature range of 600° C.-1000° C. particularly for solid carbonaceous fuels such as carbon and coal.

It is understood that chemical looping combustion processes referenced and discussed herein are exemplary applications and are not intended as limiting within this disclosure. Within this disclosure, it is only necessary that the CuO-rich copper-iron solid solution as defined herein serve as an oxygen carrier in a process utilizing oxygen, where the oxygen is supplied via a reduction of the CuO-rich copper-iron solid solution. An exemplary application is as the oxygen carrier in a chemical looping combustion process combusting a fuel.

The novel oxygen carrier of this disclosure provides for an optimum combination of copper and iron oxides to generate a CuO-rich copper-iron solid solution so that reactivity and durability are significantly enhanced in the chemical looping combustion of, for example, solid carbonaceous fuels such as coal, coke, coal and biomass char, and the like. The oxygen carrier is effective for oxygen donation under temperatures sufficient to generate char from a solid carbonaceous fuel, and is effective in facilitating the production of $CO_2$ from the resulting char. Further, the thermodynamic unfavorability of interactions between the oxygen carrier and any resulting ash provide for the effective separation of the oxygen carrier over a cyclic process. Additionally and significantly, the oxygen carrier provides reduced peak combustion temperatures and mitigates parasitic losses arising from the generally endothermic reaction between oxygen carriers and solid carbonaceous fuels. The reduced combustion temperature further increases the life-time of the oxygen carrier during multiple cycle tests.

The oxygen carrier is a CuO-rich copper-iron solid solution, as indicated by X-ray diffraction (XRD) analysis. The copper and iron metal oxides comprising the oxygen carrier behave as a single component demonstrating a single characteristic reduction temperature when CuO and $Fe_2O_3$ contents of the pre-calcined mixture are maintained within the ranges disclosed. The CuO-rich copper-iron solid solution generates highly mobile oxygen atoms, and reactivity significantly improves over that of crystalline $Fe_2O_3$. Oxygen carriers comprised of CuO and $Fe_2O_3$ outside of the specified ranges generally result in separate combustion temperature peaks indicating oxygen donation at two separate temperatures, corresponding to a lower temperature associated with CuO and a higher temperature corresponding to $Fe_2O_3$.

Without being bound by theory, the CuO-rich copper-iron solid solution may foster a mechanism where, when the CuO donates oxygen at a lower temperature, reduced copper can either abstract oxygen from adjacent iron oxide and donate it, or activate the iron oxide to donate oxygen at a lower temperature. Thus the CuO-rich copper-iron solid solution becomes more reactive than iron oxide. Additionally, the nature of the oxygen carrier as indicated by XRD analysis may indicate that the oxygen carrier structure is characterized by relatively dispersed CuO surrounded by iron oxides, serving to mitigate the agglomeration issues experienced with pure CuO.

Within this disclosure, the term "CuO-rich copper-iron solid solution" means a solid-state solution of CuO and iron oxides where the CuO serves as the solvent and the iron oxides serve as the solute. The CuO-rich copper-iron solid solution of this disclosure is characterized by a CuO crystalline structure and the absence of iron oxide crystalline structures, as indicated by XRD crystallography after sample calcination. CuO and $Fe_2O_3$ may form non-crystalline solid solution after calcinations.

Within this disclosure, "reducing" or "reduction" as it applies to an oxygen carrier means the loss of oxygen from the oxygen carrier. For example, the reduction of a generic $Me_xO_y$ composition to a generic $Me_xO_{y-1}$ composition. "Oxidizing" or "oxidation" as it applies to an oxygen carrier or a fuel means the gain of oxygen by the oxygen carrier or the fuel, or by the fuel's constituent parts or fuel derived molecules or compounds. For example, the oxidation of a generic $Me_xO_{y-1}$ composition to a generic $Me_xO_y$ composition. Similarly, a "reducing temperature" is a temperature sufficient to generate reduction and an "oxidizing temperature" is a temperature sufficient to generate oxidation under other prevailing and germane existing conditions.

Within this disclosure, "fuel" means a substance oxidized in a fuel reactor, where the oxygen gained results from the reduction of an oxygen carrier in the fuel reactor. Exemplary fuels are gaseous hydrocarbon fuels such as methane and solid carbonaceous fuels such as coal, coke, coal and biomass char, and the like.

The CuO-rich copper-iron solid solution may be fabricated through calcination of a mixture of at least 24 wt % CuO, at least 10 wt % $Fe_2O_3$, and an inert support for a temperature and for a time sufficient to generate the CuO-rich copper-iron solid solution as defined here.

The novel oxygen carrier may be utilized in a combustion process conducted by introducing a fuel and the oxygen carrier into a fuel reactor. The fuel reactor is maintained at a reducing temperature sufficient to reduce at least some portion of the oxygen carrier, producing a reduced carrier, and sufficient to oxidize at least some portion of the fuel. When the fuel is a solid carbonaceous fuel, a gasification agent is additionally introduced to the fuel reactor, and the reducing temperature is additionally sufficient for the oxidation of carbon comprising the solid carbonaceous fuel. The oxygen reduced from the oxygen carrier may react with the oxidized carbon to generate $CO_2$, or may react with volatiles driven from the solid carbonaceous fuel in the fuel reactor. Further, the oxygen carrier may directly react with carbon comprising the solid carbonaceous fuel when sufficient solid-solid contact is established. See Siriwardane et al., "Evaluation of reaction mechanism of coal-metal interactions in chemical looping combustion", *Combustion and Flame* 157 (2010).

The reduced carrier may be subsequently oxidized by contacting the reduced carrier and an oxidizing gas such as air in an oxidizing reactor, thereby generating a re-oxidized carrier. Transfer between the fuel reactor and the oxidizing reactor may be utilized to facilitate a cyclic process. An exhaust stream comprised of $CO_2$ and $H_2O$ may be withdrawn from the fuel reactor for sequestration or other purposes. A heated gas stream may be withdrawn from the oxidizing reactor and sent to a power island for the generation of power.

Solid carbonaceous fuel means a fuel which enters the fuel reactor as a solid and is comprised of carbon, such as coal, coke, coal and biomass char, and the like. Under the reducing temperature of the fuel reactor, the solid carbonaceous fuel may produce volatile gases and other compounds in the fuel reactor. Gasification agent means a gas which reacts with carbon at the combustion temperature in the fuel reactor to generate CO. Exemplary gasification agents include $CO_2$ or $H_2O$. The inert support is inert with respect to the solid carbonaceous fuel, and supports the CuO-rich copper-iron solid solution. Exemplary inert supports are alumina and bentonite, among others.

Proof of concept and the advantages afforded over current approaches are detailed below.

Demonstration and Description of a Preferred Embodiment

Embodiments of the oxygen carrier disclosed herein were prepared and evaluated for performance against selected and currently utilized single oxide systems. The evaluation demonstrates that the oxygen carrier disclosed provides significant enhancements in reactivity and durability over the currently utilized single oxide systems while providing for high combustion percentage and combustion rate. The oxygen carrier of this disclosure is particularly effective for chemical looping combustion systems utilizing solid carbonaceous fuels such as coal, coke, coal and biomass char, and the like.

Compositional Evaluation:

As a baseline, metal oxides currently in use were evaluated for performance in the combustion of a coal fuel using thermogravimetric analysis (TGA). TGA was conducted in a thermogravimetric analyzer (TA Model 2050) with a mass spectrometer (Pfeiffer Thermostar D-35614) for analyzing the composition of the outlet gas stream from TGA. Samples were placed in a 5-mm deep and 10-mm diameter crucible. About 100 mg of the solid fuel-metal oxide mixture was heated in a quartz bowl from ambient to 900 or 1000° C. at a heating rate of 15° C./min in $N_2$ gases with flow rate of 100 sccm. The sample was then kept isothermal for about 30 minutes.

Fractional reductions were calculated utilizing the TGA data, where fractional reduction is defined as: Fractional Reduction $(X)=(M_o-M)/(M_o-M_f)$ with, M=Instantaneous weight of metal oxide-coal mixture,
$M_o$=Initial weight of metal oxide-coal mixture, and
$M_f$=Weight of metal oxide-coal mixture after reaction.

The global rates of reactions (dX/dt) were calculated by differentiating fractional conversions (X).

The combustion properties of coal with a single metal oxide supported on bentonite during TGA experiments are listed in Table 1 as base line data. Among the bentonite supported oxygen carriers, 60% CuO/bentonite sample showed full combustion with a moderate reaction rate at a temperature of 749° C. 60% $Fe_2O_3$/bentonite sample showed a low combustion percentage with a slower reaction rate at a higher temperature of at 100° C. 60% NiO/bentonite had poor combustion percentage with good reaction rate at 1000° C. In addition, all three bentonite supported pure metal oxide samples possess moderate reaction rates and high oxygen uptakes during the oxidation reaction. The 60% CuO/bentonite sample was also tested in a bench scale reactor for a chemical looping combustion reaction with coal at a temperature of 700-800° C. Agglomeration of copper particles was observed.

The combustion performance in TGA of mixed Cu—Fe oxide oxygen carriers with various compositions are summarized in Table 2. Note that there is one peak temperature for reduction for most compositions of CuO—Fe2O3 as shown in Table 2, even though the sample consists of two metal oxides, indicating that the two metal oxides behave as one component. XRD analysis of the mixed metal oxide did not show one phase, but Fe2O3 phase was not present indicating that an amorphous solution of Fe2O3 may have been formed.

From Table 2, it can be observed that when the CuO concentration is high the combustion rate and percentage of combustion is high. However, as noted previously, the presence of higher CuO contributes to agglomeration during the reaction. As a result, it is desired to use a minimum concentration of CuO without unduly compromising the reactivity.

For the samples containing 10% $Al_2O_3$, a 60% CuO weight loading is generally necessary to obtain combustion >90%. The addition of $Fe_2O_3$ increases the reaction temperature and decreases the combustion rates. Reasonable (~80%) combustion percentage can be obtained with the samples containing as much as 80% $Fe_2O_3$ but better rates can be achieved below 45%. Both 60% CuO-20% $Fe_2O_3$/ 20% $Al_2O_3$ and 40% CuO-40% $Fe_2O_3$/20% $Al_2O_3$ possess reasonable combustion percentage, lower reaction peak temperature and moderate reaction rates. The samples containing 30% $Al_2O_3$ showed lower percentages of combustion indicating that the reactivity is sensitive to alumina concentration.

For all mixed metal oxide samples, the combustion peak temperatures were around 750-890° C. which is lower than that for pure $Fe_2O_3$. Generally, the data indicates favorable oxygen carrier compositions at around 60% CuO, less than 45% $Fe_2O_3$ and less than 30% $Al_2O_3$, based on the resulting reactivity.

Oxygen Carrier Preparation Evaluations:

Since the sample containing 60% CuO-20% $Fe_2O_3$/20% $Al_2O_3$ (sample (5) at Table 2) showed good performance during TGA tests, the impact of preparation method was evaluated using bench scale reaction tests with 60% CuO-20% $Fe_2O_3$/20% $Al_2O_3$ samples prepared by various methods. Subsequently, the TGA combustion performance of carbon with the oxygen carriers prepared by the various preparation methods was evaluated. The various preparation methodologies included:

Physical mixing method: Pure CuO, $Fe_2O_3$ and $Al_2O_3$ support were mixed thoroughly and deionized water was added to the powder mixture to obtain a paste. The paste was dried at room temperature for 24 hours. The dried material was then calcined at 900° C. in air for 8 hours. The calcined sample was crushed into smaller particles of the desired mesh size (140-170 mesh).

Liquid impregnation method: Nitrates of copper, iron were mixed and dissolved in the desired amount water, and then the solution was added drop wise to $Al_2O_3$ support while stirring. The paste was dried at room temperature for 24 hours and calcined at 900° C. in air for 8 hours. The calcined sample was crushed into smaller particles of the desired mesh size (140-170 mesh).

Co-precipitation method: Nitrates of copper, iron, nickel and aluminum were mixed and dissolved in water. Then ammonia was added drop wise while stirring until all metal hydroxides were precipitated. The solid precipitate was filtered and the paste was dried at room temperature for 24 hours and calcined at 900° C. in air for 8 hours. The calcined sample was crushed into smaller particles of the desired mesh size (140-170 mesh).

Direct decomposition method: Nitrates of copper, iron and alumina were thoroughly mixed and heated at 350° C. for 4 hours, and then the mixture was calcined at 900° C. in air for 8 hours. The calcined sample was crushed into smaller particles of the desired mesh size (140-170 mesh).

The TGA combustion performance of carbon with oxygen carriers prepared by the various preparation methods are summarized in Table 3. The data suggests that the oxygen carriers with similar components but prepared different method possess similar reaction performance. The sample prepared with physical mixing method, co-precipitation method and direct decomposition have similar reaction rates, combustion percentages. The sample prepared by wet-impregnation, however, showed two combustion peaks, which indicates that the CuO may have not fully interacted with $Fe_2O_3$ to form uniform species. In addition, low combustion percentage was observed with this sample. A sample prepared by direct decomposition method had the highest combustion temperature. Generally speaking, physical mixing and co-precipitation demonstrated better performances.

Cycling TGA Test Evaluations:

A ten cycle TGA test of the 60% CuO-20% $Fe_2O_3$/20% $Al_2O_3$ oxygen carriers was conducted with carbon and the oxygen carrier (140-170 mesh) prepared using the physical mixing and co-precipitation methods. Carbon was added after every cycle to keep the initial weight constant. Carbon was used as the fuel to avoid ash separation after each cycle.

For conduct of the bench-scale tests, carbon and the oxygen carrier under evaluation was packed with quartz wool in an 11-inch-long ceramic reactor (0.25 inches OD) inside a stainless steel shell. The gases were introduced to the reactor from gas cylinders through mass flow controllers. The product gas and reaction temperatures were continuously analyzed with an online mass spectrometer (Quadrupole Prisma, Pfeiffer). Multi-cycle CLC tests were conducted at 10 psi. Pure He was used during temperature ramp for reduction and air was used for oxidation. LABTECH NOTEBOOK pro was used to monitor the reactor pressure during the experiments.

For the 60% CuO-20% $Fe_2O_3$/20% $Al_2O_3$ oxygen carrier prepared by physical mixing, the reaction performance data is summarized in Table 4. The combustion percentage was fairly constant (80-98%) during cycling tests which indicated that the oxygen carriers are fully recovered/oxidized after each cycle and they participate in full combustion with carbon. Peak reaction temperature gradually increased from 795° C. to 826° C. with increasing cycle numbers and the combustion rates also increased from 0.037 to 0.050 $min^{-1}$ possibly because of higher reaction temperatures. Considering the experiment error introduced in cycling test, such as weight loss in sample handling, quartz wool addition, it is reasonable to conclude the sample is stable during 10-cycle tests.

Combustion performance for the 60% CuO-20% $Fe_2O_3$/ 20% $Al_2O_3$ oxygen carrier prepared by physical mixing over the 10-cycle bench-scale flow reactor test is summarized in Table 5. Data indicated that the CLC reaction performance is stable for 10 cycles. The $CO_2$ concentrations maintained around 4%, and the combustion peak temperatures varied in a narrow range of 660-700° C. A small concentration of CO was observed due to incomplete combustion. The oxidation performances for the 10-cycle test are summarized in Table 6. The oxygen breakthrough time (oxygen concentration reaches 0.5%) was stable for all cycles, and high oxygen uptake was observed during re-oxidation. Thus, the bench scale tests indicated that the reaction performance of this sample is stable for carbon combustion and has high potential for an oxygen carrier for industrial application. It is also significant that there was no agglomeration of CuO—$Fe_2O_3$/ $Al_2O_3$ oxygen carriers after the 10-cycle test. This is remarkable since there was a significant agglomeration of pure CuO after one cycle test with either coal or carbon in the bench scale reactor.

For the 60% CuO-20% $Fe_2O_3$/20% $Al_2O_3$ oxygen carrier prepared by co-precipitation, the performance data over a 10-cycle bench-scale flow reactor CLC test is summarized in Table 7. Similar to the results obtained from the sample prepared by physical mixing method, this sample also showed stable performance during 10 cycle tests. The $CO_2$ concentrations maintained around 3%. The combustion peak temperatures were in the narrow range of 640-700° C. Small concentrations of CO were observed indicating some incomplete combustion.

The oxidation performances for 10-cycle test are summarized in Table 8. The oxygen breakthrough time was stable during all cycling tests, and high oxygen uptakes were observed during re-oxidation. Therefore, the bench scale tests indicated that the reaction performance of this sample has high potential for use as industrial oxygen carriers. No agglomeration of the oxygen carriers was observed.

The 60% CuO-20% $Fe_2O_3$-20% $Al_2O_3$ oxygen carrier evaluated in the cycling test had good reactivity for solid fuel combustion at temperatures below 900° C. This is significantly better than that was observed with pure $Fe_2O_3$. The testing indicated that the agglomeration issue is largely mitigated by the mixed metal oxide for the compositions evaluated.

Figure 1:
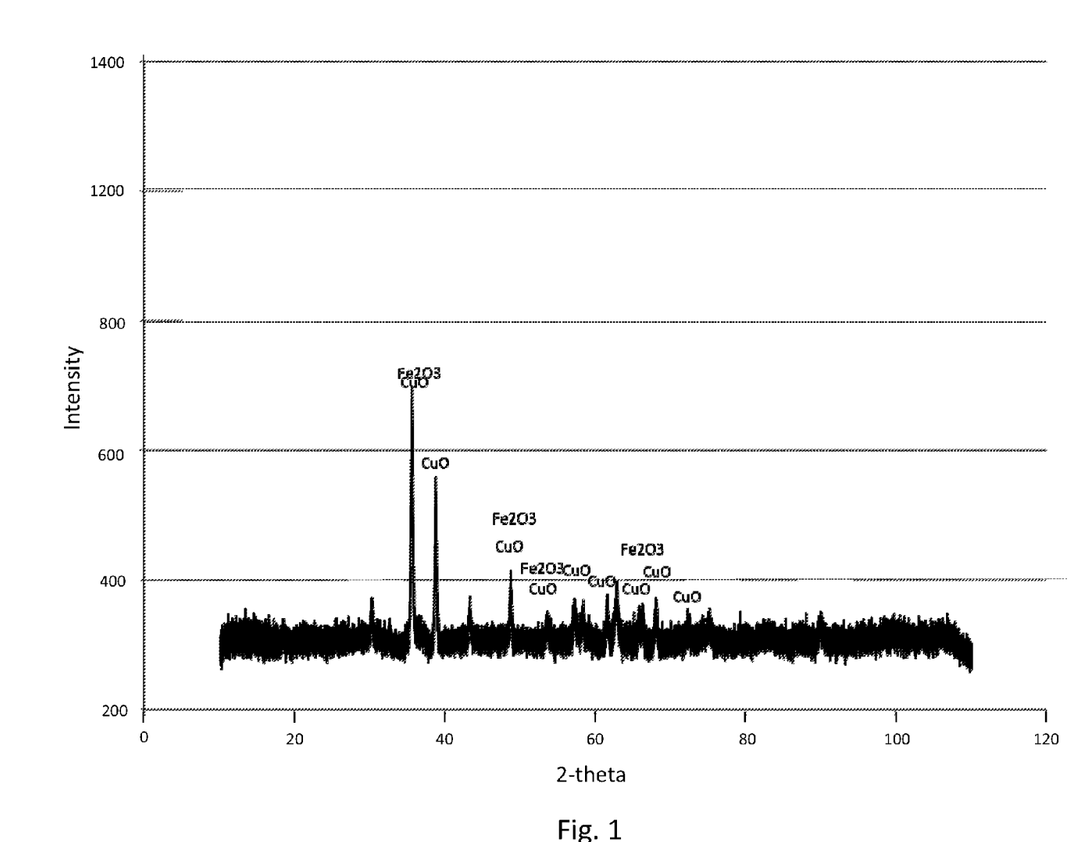
FIG. 1 illustrates XRD results for an oxygen carrier comprised of a mixture of CuO and Fe2O3 before calcination.
Figure 2:
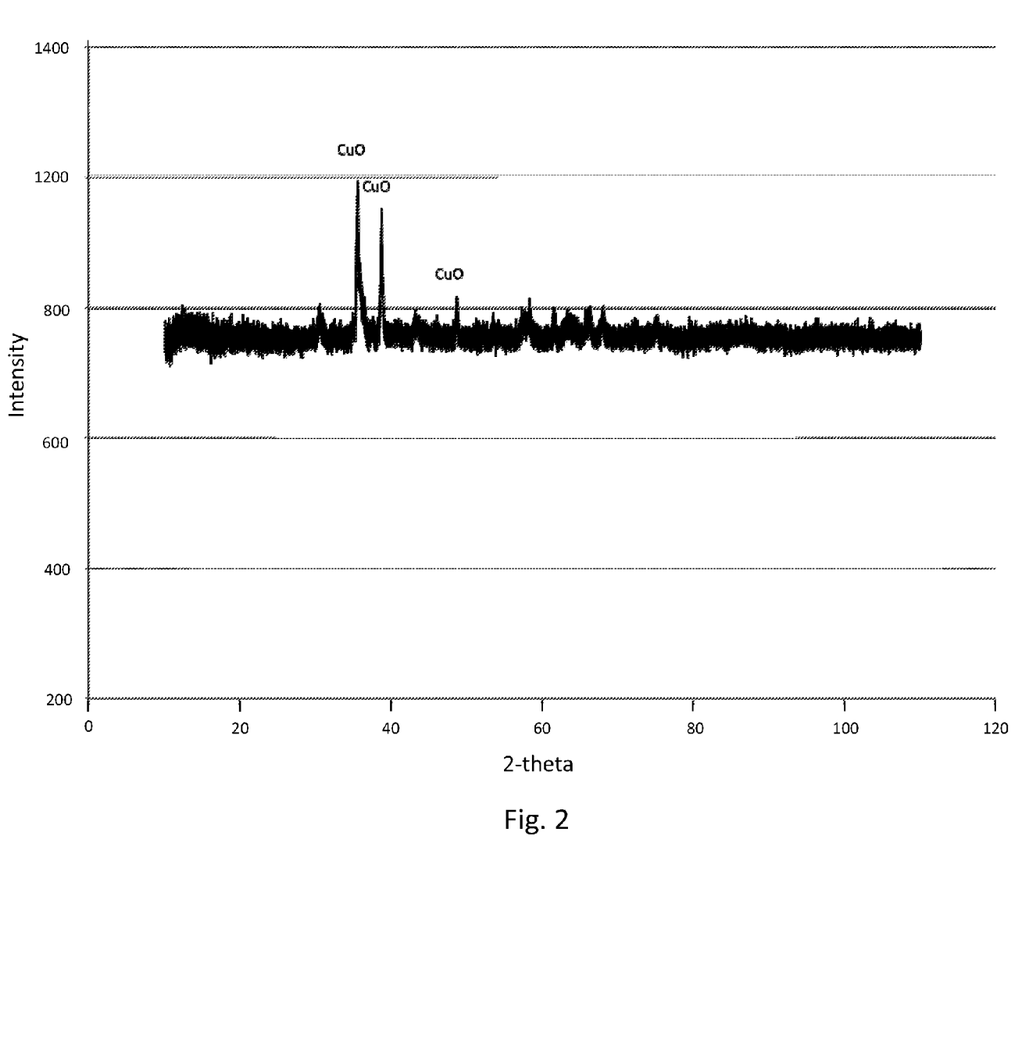
FIG. 2 illustrates XRD results for an oxygen carrier comprised of the CuO-rich copper-iron solid solution.
Figure 3:
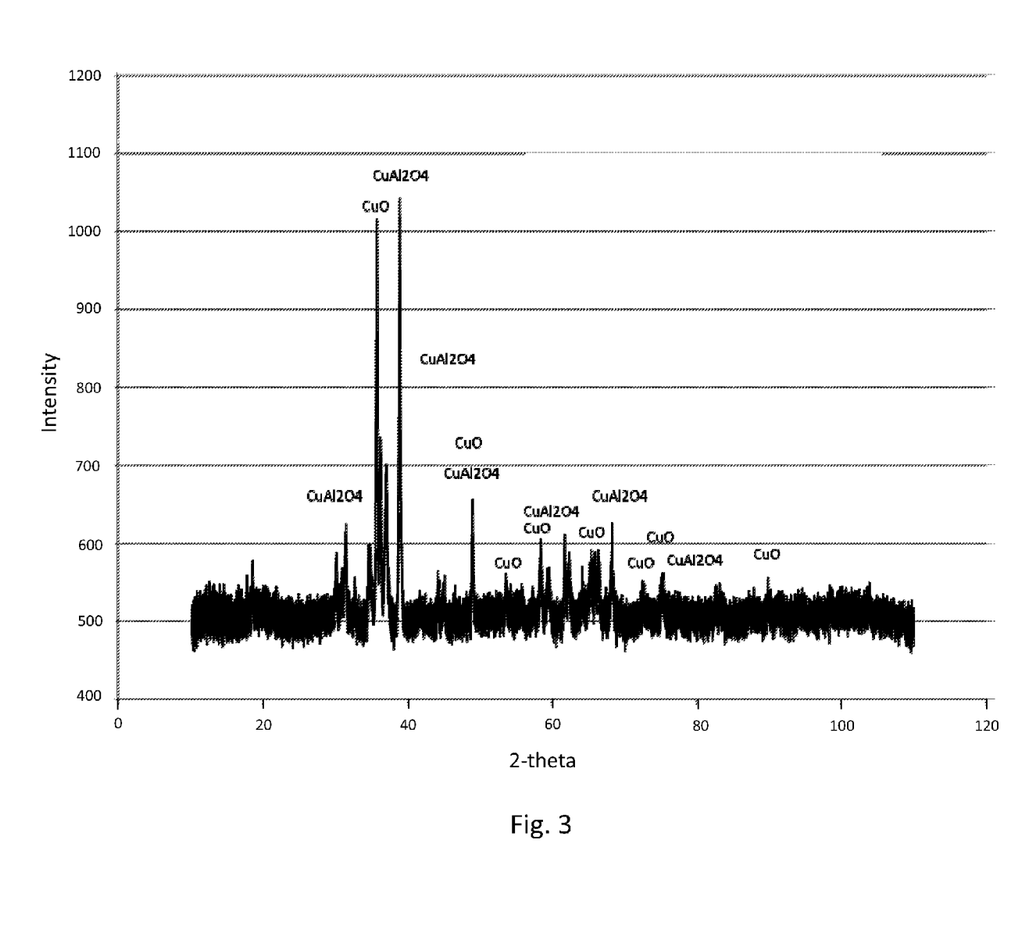
FIG. 3 illustrates XRD results for an oxygen carrier comprised of the CuO-rich copper-iron solid solution after 10 cycle coal-chemical looping combustion test.

The oxygen carrier is a solid solution of CuO and iron oxides, as indicated by X-ray diffraction (XRD) analysis. This is indicated by the XRD results of FIGS. 1 and 2. FIG. 1 indicates XRD of a 60% CuO-20% $Fe_2O_3$/20% $Al_2O_3$ oxygen carrier prepared by simply mixing the components without calcination. As indicated, FIG. 1 clearly indicates the mixture of crystalline CuO and $Fe_2O_3$. The absence of the $Al_2O_3$ pattern is reasonable because of the amorphous $Al_2O_3$ structure. In contrast, FIG. 2 demonstrates XRD results of the 60% CuO-20% $Fe_2O_3$/20% $Al_2O_3$ oxygen carrier following calcinations at 900° C. At FIG. 2, the CuO profile appears with reduced intensity and the $Fe_2O_3$ has disappeared, indicating the absence of crystalline $Fe_2O_3$. Similarly, a more detailed XRD analysis with CuO—$Fe_2O_3$—$Al_2O_3$ after 10 cycle test indicates that a small amount of CuO can interact with $Al_2O_3$ to form $CuAl_2O_4$, but $Fe_2O_3$ is still not observed.

The XRD analysis indicates that there is a strong interaction between CuO and $Fe_2O_3$ during the calcinations. A solid solution of CuO and iron oxide may be formed, which results in the breakage of the crystalline structure of both CuO and $Fe_2O_3$. The $Fe_2O_3$ becomes highly dispersed and adjacent with the CuO. As a result, the oxygen atoms in the CuO—$Fe_2O_3$ oxygen carrier are much more mobile and reactive than that of crystalline CuO or $Fe_2O_3$. The structure results in a lower reduction temperature for the oxygen carrier than that for pure $Fe_2O_3$. Additionally, because CuO particles are separated from each other by the surrounding dispersed $Fe_2O_3$, it is difficult for the CuO to contact and agglomerate during a reaction process. This manifests as an excellent stability of the oxygen carrier during the multiple cycle reaction tests.

XRD analyses were carried out using a Panalytical PW 3040 X-Pert Pro XRD system equipped with a 60 kV PW 3373/00 Cu LFF high-power ceramic tube with a Cu anode and a PW 3011/20 detector. The X-ray wavelength used was Cu KR-1 at 1.540 56 angstrom. The maximum goniometer resolution was 0.003° (2θ). System calibration was carried out using a polysilicon-pressed disk with the Si(111) referenced to 28.443° (2θ). Sample data were acquired at 40 kV and 45 mA in a line-focus mode using a standard PW3071/60 powder diffraction stage.

Figure 4:
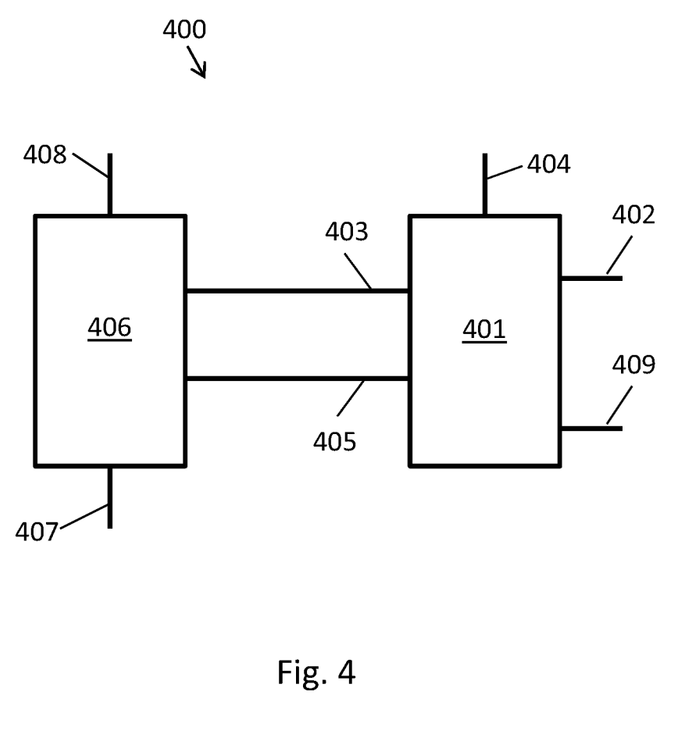
FIG. 4 illustrates a chemical looping combustion process utilizing an oxygen carrier comprised of the CuO-rich copper-iron solid solution.

A chemical looping combustion system within which the oxygen carrier disclosed here might be utilized is illustrated at FIG. 4. FIG. 4 illustrates a chemical combustion system generally at 400 and includes fuel reactor 401. Fuel reactor 401 receives a fuel flow of solid carbonaceous fuel at 402, a flow of gasification agent at 409, and the oxygen carrier at 403, and facilitates contact between the solid carbonaceous fuel, the oxygen carrier, and the gasification agent. Fuel reactor 401 further has a combustion temperature sufficient to oxidize carbon in contact with the gasification agent and the oxygen carrier, and sufficient to reduce at least a portion of the oxygen carrier. For example, the oxygen carrier may be reduced from a generic $Me_xO_y$ composition to a reduced carrier having a generic $Me_xO_{y-1}$ composition, where $Me_xO_y$ represents a metal oxide or combination of metal oxides, and $Me_xO_{y-1}$ represents a reduced form of the metal oxide or combination of metal oxides. Following the reduction and oxidation, and exhaust stream comprised of $CO_2$ and $H_2O$ may exit fuel reactor 401 at exhaust 404, and the reduced carrier may exit fuel reactor 401 at 405.

The oxygen carrier entering fuel reactor 401 at 403 is comprised of a CuO-rich copper-iron solid solution on an inert support. In an embodiment, the inert support is alumina or bentonite. The CuO-rich copper-iron solid solution may be a calcine generated from a mixture of at least 24 wt % CuO, at least 10 wt % $Fe_2O_3$, and the inert support.

The reduced carrier exiting fuel reactor 401 at 405 may subsequently enter oxidation reactor 406. Oxidation reactor 406 further receives a flow of oxidizing gas such as air, and facilitates contact between the reduced carrier and the oxidizing gas. The temperature of oxidation reactor 406 is sufficient to oxidize the reduced carrier as a result of the contact with the some portion of the oxygen comprising the oxidizing gas, generating a re-oxidized carrier having the generic $Me_xO_y$ composition. The oxidizing reaction occurring in oxidation reactor 406 is an exothermic reaction, and heat generated is carried from oxidizing reactor 406 by a gaseous flow exiting at 408. The gaseous flow exiting at 408 is comprised of the oxidizing gas less that oxygen utilized for the generation of the re-oxidized carrier, and may be sent to and utilized by a power generation cycle. For example, when the flow of oxidizing gas is air, the gaseous flow exiting at 408 is comprised of $N_2$ and possibly some remaining $O_2$, and other components. The re-oxidized carrier may be subsequently transported to fuel reactor 401 for use as the oxygen carrier in a cyclic operation.

It is understood that FIG. 4 provides an exemplary application illustrating a chemical looping combustion process with a solid carbonaceous fuel such as coal, coke, coal and biomass char, and the like, however this is not intended to be limiting. Within this disclosure, it is only necessary that the CuO-rich copper-iron solid solution as defined herein serve as an oxygen carrier in a process utilizing oxygen, where the oxygen is supplied via a reduction of the CuO-rich copper-iron solid solution. An exemplary application is as the oxygen carrier in a chemical looping combustion process combusting a fuel, including solid carbonaceous fuels such as coal, coke, coal and biomass char, and the like.

Thus, the disclosure herein provides an oxygen carrier having improved durability and reactivity over metal oxides currently used in chemical looping applications. The oxygen carrier is comprised of a CuO-rich copper-iron solid solution and provides for increased reactivity per unit weight and enhanced physical durability and reactivity during multiple cycling combustion-regeneration reactions. The oxygen carrier may be produced as a calcine from a mixture of at least 24 wt % CuO, at least 10 wt % $Fe_2O_3$, and an inert support. The mixed metal oxide in these proportions is reactive with solid fuels such as coal, coke, coal and biomass char, and the like with excellent efficiency and achieves appreciable combustion rates at relatively low temperatures Further, the disclosure provides an oxygen carrier for use in a chemical looping cycle such as chemical looping combustion where the higher reactivity of Cu-based carriers can be utilized with a mitigation of agglomeration.

Further, the disclosure provides an oxygen carrier for use in a chemical looping cycle where the temperature stability of $Fe_2O_3$ is largely preserved without the attendant high temperature requirement of $Fe_2O_3$ oxygen carriers.

Further, the disclosure provides an oxygen carrier for use in a chemical looping cycle which combines CuO and $Fe_2O_3$ in a manner providing for reduced agglomeration and increased durability.

Further, the disclosure provides an oxygen carrier for use in a chemical looping cycle which combines CuO and $Fe_2O_3$ in a manner providing for a reduced peak combustion temperature, in order to mitigate parasitic losses during multiple cycle tests.

Further, the disclosure provides an oxygen carrier for use in a chemical looping combustion process utilizing a solid carbonaceous fuel, where the oxygen carrier is effective for oxygen donation under temperatures sufficient to generate char and facilitate the production of $CO_2$ from the resulting char.

Further, the disclosure provides an oxygen carrier for use in a chemical looping combustion process utilizing a solid carbonaceous fuel exhibiting the lower peak combustion temperatures of CuO, in order to mitigate any parasitic losses arising from the generally endothermic reaction experienced with solid fuels.

Further, the disclosure provides an oxygen carrier for use in a chemical looping combustion process utilizing a solid carbonaceous fuel where interactions between the oxygen carrier and the resulting ash thermodynamically unfavorable, in order to facilitate more effective separation over a cyclic process.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

TABLE 1

CLC reaction performance of bentonite supported single metal oxides with coal in $N_2$

| | Combustion reaction | | Oxidation reaction at 900 oC | | |
|---|---|---|---|---|---|
| Samples | % Combustion | Peak temperature (° C.) | Combustion rate (min$^{-1}$) | Oxidation rate (min$^{-1}$) | Oxygen Uptake (%) |
| 60% CuO/Bentonite | 99.4 | 749 | 0.032 | 0.7 | 100 |
| 60% $Fe_2O_3$/Bentonite | 71.1 | 1000 | 0.029 | 0.45 | 78.6 |
| 60% NiO/Bentonite | 37.7 | 1000 | 0.014 | 0.353 | 51.2 |

TABLE 2

TGA CLC Reaction performance of supported copper-iron metal oxide with coal in $N_2$

| No. | sample | % combustion | peak temperature (oC) | combustion rate (min-1) |
|---|---|---|---|---|
| (1) | 80%CuO-10%$Fe_2O_3$/10%bentonite | 100 | 748, 810 | 0.07, 0.061 |
| (2) | 80%CuO-10%$Fe_2O_3$/10%$Al_2O_3$ | 93 | 765 | 0.07 |
| (3) | 60%CuO-30%$Fe_2O_3$/10%bentonite | 95 | 807 | 0.07 |
| (4) | 60%CuO-30%$Fe_2O_3$/10%$Al_2O_3$ | 89 | 786 | 0.07 |
| (5) | 60%CuO-20%$Fe_2O_3$/20%$Al_2O_3$ | 95 | 765 | 0.07 |
| (6) | 46%CuO-24%$Fe_2O_3$/30%$Al_2O_3$ | 79 | 785 | 0.05 |
| (7) | 45%CuO-45%$Fe_2O_3$/10%$Al_2O_3$ | 85 | 786 | 0.07 |
| (8) | 40%CuO-40%$Fe_2O_3$/20%$Al_2O_3$ | 80 | 774 | 0.05 |
| (9) | 24%CuO-46%$Fe_2O_3$/30%$Al_2O_3$ | 72 | 883 | 0.04 |
| (10) | 10%CuO-80%$Fe_2O_3$/10%$Al_2O_3$ | 83 | 888 | 0.04 |

TABLE 3

Reaction performance of supported Cu-Fe oxide (60%Cu-20%Al₂O₃/20%Al₂O₃) prepared with various methods

| Preparation methods | Combustion reaction | | | Oxidation reaction at 900° C. reaction rate (min$^{-1}$) |
|---|---|---|---|---|
| | % Combustion | Peak temperature (° C.) | Combustion rate (min$^{-1}$) | |
| Physical mixing | 95.4 | 749 | 0.032 | 0.17 |
| Wet impregnation | 50.7 | 681.1/849.5 | 0.04/0.05 | 0.17 |
| co-precipitation | 96.5 | 677.53 | 0.05 | 0.22 |
| Direct decomposition | 93.7 | 810 | 0.05 | 0.22 |

TABLE 4

TGA analysis of reaction performance of 60%CuO-20%Fe₂O₃/20%Al₂O₃ prepared by physical mixing method

| cycle | % combustion | peak temperature (° C.) | combustion rate (min-1) |
|---|---|---|---|
| 1 | 92 | 795 | 0.037 |
| 2 | 92 | 797 | 0.036 |
| 3 | 98 | 808 | 0.057 |
| 4 | 95 | 810 | 0.056 |
| 5 | 93 | 819 | 0.046 |
| 6 | 92 | 826 | 0.044 |
| 7 | 80 | 795 | 0.050 |
| 8 | 86 | 830 | 0.042 |
| 9 | 82 | 844 | 0.068 |
| 10 | 88 | 837 | 0.072 |

TABLE 5

Combustion performance of 60%CuO-20%Fe₂O₃/20%Al₂O₃ prepared by physical mixing method during 10-cycle bench scale CLC reactor tests with carbon

| cycle number | peak temperature (° C.) | CO2 peak concentration (%) | CO peak concentration (%) | Combustion percentage (%) |
|---|---|---|---|---|
| 1 | 622 | 4.4 | 0.41 | 95.2 |
| 2 | 734 | 3.8 | 0.31 | 89.8 |
| 3 | 673 | 3 | 0.33 | 91.7 |
| 4 | 725 | 4.42 | 0.43 | 94.4 |
| 5 | 670 | 3.96 | 0.38 | 88.6 |
| 6 | 684 | 4 | 0.34 | 96.1 |
| 7 | 683 | 3.99 | 0.32 | 97.8 |
| 8 | 643 | 4.9 | 0.48 | 93.2 |
| 9 | 674 | 3.2 | 0.34 | 90.4 |
| 10 | 668 | 4.3 | 0.42 | 94.8 |

TABLE 6

Oxidation performance of 60%CuO-20%Fe₂O₃/20%Al₂O₃ prepared by physical mixing method during 10-cycle bench scale CLC reactor tests with carbon

| cycle number | oxygen breakthrough time (hours) | Oxygen uptakes (%) |
|---|---|---|
| 1 | 4.53 | 81.4 |
| 2 | 5.22 | 94.2 |
| 3 | 5.09 | 91.6 |
| 4 | 4.79 | 86.2 |
| 5 | 5.04 | 90.9 |
| 6 | 5.17 | 93.4 |
| 7 | 5.04 | 90.9 |
| 8 | 4.91 | 88.5 |
| 9 | 4.78 | 86.1 |
| 10 | 5.11 | 92.2 |

TABLE 7

Combustion performance of 60%CuO-20%Fe₂O₃/20%Al₂O₃ prepared by co-precipitation method during 10-cycle bench scale CLC reactor tests with carbon

| cycle number | peak temperature (° C.) | CO2 peak concentration (%) | CO peak concentration (%) | Combustion percentage (%) |
|---|---|---|---|---|
| 1 | 637 | 2.88 | 0.34 | 96 |
| 2 | 629 | 2.46 | 0.27 | 97 |
| 3 | 635 | 1.96 | 0.38 | 92 |
| 4 | 678 | 2.26 | 0.26 | 87 |
| 5 | 670 | 3.55 | 0.36 | 89 |
| 6 | 687 | 2.48 | 0.25 | 96 |
| 7 | 706 | 2.26 | 0.23 | 93 |
| 8 | 658 | 2.91 | 0.29 | 89 |
| 9 | 661 | 3.22 | 0.32 | 89 |
| 10 | 697 | 2.32 | 0.23 | 93 |

TABLE 8

Oxidation performance of 60%CuO-20%Fe₂O₃/20%Al₂O₃ prepared by co-precipitation during 10-cycle bench scale CLC reactor tests with carbon

| cycle number | oxygen breakthrough time (min) | Oxygen uptakes (%) |
|---|---|---|
| 1 | 3.98 | |
| 2 | 3.82 | 90 |
| 3 | 3.50 | 82 |
| 4 | 3.83 | 90 |
| 5 | 3.60 | 85 |
| 6 | 3.88 | 92 |
| 7 | 3.95 | 93 |
| 8 | 3.78 | 89 |
| 9 | 3.88 | 92 |
| 10 | 3.52 | 93 |

What is claimed is:

1. A method of delivering oxygen to a fuel reactor using an oxygen carrier comprising:
   gathering an oxygen carrier, where the oxygen carrier is a solid-state solution having a solvent and a solute where CuO is the solvent and iron oxides are the solute, where the CuO rich copper-iron solid solution is comprised of at least 24 wt % copper and at least 10% of iron and prepared via a calcination process, and where the oxygen carrier has a CuO crystalline structure and an absence of an Fe2O3 crystalline structure after calcination and before reduction:
   delivering the oxygen carrier to the fuel reactor, mixing a fuel and the oxygen carrier in the fuel reactor; and
   maintaining the fuel reactor at a reducing temperature, where the reducing temperature is sufficient to reduce at least some portion of the oxygen carrier and oxidize at least some portion of the fuel, thereby producing a reduced carrier, thereby delivering oxygen to the fuel reactor using the oxygen carrier.

2. The method of claim 1 where the fuel is a solid carbonaceous fuel and further comprising:
generating contact between the fuel and a gasification gas in the fuel reactor; and
maintaining the fuel reactor at the reducing temperature, where the reducing temperature is further sufficient to oxidize carbon comprising the fuel when the fuel contacts the gasification gas.

3. The method of claim 1 where the oxygen carrier comprises at least 40 wt % CuO and at least 20 wt % $Fe_2O_3$.

4. The method of claim 3 where the inert support comprises alumina, bentonite, or combinations thereof, and where the inert support comprises less than 40 wt % of the oxygen carrier.

5. The method of claim 1 further comprising:
transferring the reduced carrier from the fuel reactor to an oxidizing reactor; providing an oxidizing gas to the oxidizing reactor, where the oxidizing gas comprises oxygen; and
oxidizing the reduced carrier by contacting the reduced carrier and some portion of the oxygen comprising the oxidizing gas and generating a re-oxidized carrier where the re-oxidized carrier is the solid-state solution where CuO is the solvent and iron oxides are the solute, and where the oxygen carrier has the CuO crystalline structure and the absence of the $Fe_2O_3$ crystalline structure.

6. The method of claim 5 further comprising: withdrawing an exhaust stream from the fuel reactor, where the exhaust stream comprises $CO_2$ and $H_2O$; discharging an oxidation stream from the oxidizing reactor, where the oxidation stream is comprised of the oxidizing gas less the some portion of the oxygen comprising the oxidizing gas; retrieving the re-oxidized carrier from the oxidizing reactor, thereby gathering the oxygen carrier; and repeating the delivering the oxygen carrier to the fuel reactor, the mixing the fuel and the oxygen carrier in the fuel reactor, the maintaining the fuel reactor at the reducing temperature, the transferring the reduced carrier from the fuel reactor to the oxidizing reactor, the providing the oxidizing gas to the oxidizing reactor, the oxidizing the reduced carrier, the withdrawing the exhaust stream from the fuel reactor, the discharging the oxidation stream from the oxidizing reactor, and the retrieving the re-oxidized carrier from the oxidizing reactor utilizing a second portion of fuel as the fuel and the re-oxidized carrier as the oxygen carrier.

7. A method of conducting a chemical looping process using an oxygen earner comprising:
gathering an oxygen carrier, where the oxygen carrier is a CuO-rich copper-iron solid solution on an inert support where the CuO-rich copper-iron solid solution is a solid-state solution having a solvent and a solute where CuO is the solvent and iron oxides are the solute, where the CuO rich copper-iron solid solution is comprised of at least 24 wt % copper and at least 10% of iron and prepared via a calcination process, and where the CuO-rich copper-iron solid solution is a material characterized by an X-ray diffraction pattern indicating a presence of a CuO crystalline structure and an absence of iron oxide crystalline structures after calcination and before reduction;
delivering the oxygen carrier to the fuel reactor;
mixing a fuel and the oxygen carrier in the fuel reactor;
combusting the fuel by maintaining the fuel reactor at a reducing temperature of from about 600° C. to about 1000° C. where the reducing temperature is sufficient to reduce at least some portion of the oxygen carrier, thereby producing a reduced carrier, and where the reducing temperature is further sufficient to oxidize at least some portion of the fuel, generating $CO_2$ and $H_2O$;
transferring the reduced carrier from the fuel reactor to an oxidizing reactor;
supplying an oxidant gas to the oxidizing reactor, where the oxidizing gas is comprised of oxygen;
oxidizing the reduced carrier by contacting the reduced carrier and some portion of the oxygen comprising the oxidizing gas and generating a re-oxidized carrier where the re-oxidized carrier is a second CuO-rich copper-iron solid solution on the inert support;
retrieving the re-oxidized carrier from the oxidizing reactor, thereby gathering the oxygen carrier; and
transporting the re-oxidized carrier from the oxidizing reactor to the fuel reactor, and repeating the delivering the oxygen carrier to the fuel reactor, the mixing the fuel and the oxygen carrier in the fuel reactor, the combusting the fuel, the transferring the reduced carrier from the fuel reactor to the oxidizing reactor, the supplying the oxidant gas to the oxidizing reactor, the oxidizing the reduced carrier, and the retrieving the re-oxidized carrier from the oxidizing reactor utilizing a second portion of fuel as the fuel and the re-oxidized carrier as the oxygen carrier,
thereby conducting the chemical looping process using the oxygen carrier.

8. The method of claim 7 where the fuel is a solid carbonaceous fuel and further comprising: generating contact between the solid carbonaceous fuel and a gasification gas in the fuel reactor; and maintaining the fuel reactor at the reducing temperature, where the reducing temperature is further sufficient to oxidize carbon comprising the solid carbonaceous fuel when the fuel contacts the gasification gas.

9. The method of claim 3 where the oxygen carrier comprises greater than 40 wt % CuO and less than or equal to 40 wt % $Fe_2O_3$.

10. The method of claim 7 where the X-ray diffraction pattern of the oxygen carrier indicates the presence of the CuO crystalline structure and the absence of the $Fe_2O_3$ crystalline structure using Cu KR-1 radiation.

11. The method of claim 1 where the reducing temperature is greater than or equal to 600° C. and less than or equal to 1000° C.

12. The method of claim 11 further comprising: transferring the reduced carrier from the fuel reactor to an oxidizing reactor; providing an oxidizing gas to the oxidizing reactor, where the oxidizing gas comprises oxygen; and oxidizing the reduced carrier by contacting the reduced carrier and some portion of the oxygen comprising the oxidizing gas and generating a re-oxidized carrier where the re-oxidized carrier is the solid-state solution where CuO is the solvent and iron oxides are the solute, and where the oxygen carrier has the CuO crystalline structure and the absence of the $Fe_2O_3$ crystalline structure; retrieving the re-oxidized carrier from the oxidizing reactor, thereby gathering the oxygen carrier; and transporting the re-oxidized carrier from the oxidizing reactor to the fuel reactor and repeating the delivering the oxygen carrier to the fuel reactor, the mixing the fuel and the oxygen carrier in the fuel reactor, the maintaining the fuel reactor at the reducing temperature, the transferring the reduced carrier from the fuel reactor to the oxidizing reactor, the providing the oxidizing gas to the oxidizing reactor, the oxidizing the reduced carrier, and the retrieving the re-oxidized carrier from the oxidizing reactor utilizing a second portion of fuel as the fuel and the re-oxidized carrier as the oxygen carrier.

13. The method of claim 12 further comprising maintaining the oxidizing reactor at an oxidation temperature where the oxidation temperature is greater than or equal to 600° C. and less than or equal to 1000° C.

14. The method of claim 12 further comprising maintaining the oxidizing reactor at an oxidation temperature where the oxidation temperature is greater than or equal to 640° C.

15. The method of claim 7 further comprising maintaining the oxidizing reactor at an oxidation temperature where the oxidation temperature is greater than or equal to 640° C.

16. The method of claim 15 where the oxygen carrier comprises greater than 40 wt % CuO and less than or equal to 40 wt % $Fe_2O_3$.

17. The method of claim 5 where the oxygen carrier has an absence of iron oxide crystalline structures and where the re-oxidized carrier has the absence of iron oxide crystalline structures.

18. The method of claim 15 where the oxygen carrier comprises at least 40 wt % CuO and at least 20 wt % $Fe_2O_3$.

19. The method of claim 18 where the oxygen carrier comprises less than 45 wt % $Fe_2O_3$.

20. A method of conducting a chemical looping process using an oxygen earner comprising:
    gathering an oxygen carrier, where the oxygen carrier is a solid-state solution having a solvent and a solute where CuO is the solvent and iron oxides are the solute, and where the oxygen carrier comprises greater than 40 wt % CuO and less than or equal to 40 wt % $Fe_2O_3$ on an inert support, and where the oxygen carrier has a CuO crystalline structure and an absence of iron oxide crystalline structures after calcination and before reduction;
    delivering the oxygen carrier to the fuel reactor;
    mixing a fuel and the oxygen carrier in the fuel reactor; and
    maintaining the fuel reactor at a reducing temperature of from about 600° C. to about 1000° C., where the reducing temperature is sufficient to reduce at least some portion of the oxygen carrier and oxidize at least some portion of the fuel, thereby producing a reduced carrier, thereby delivering oxygen to the fuel reactor using the oxygen carrier;
    transferring the reduced carrier from the fuel reactor to an oxidizing reactor;
    maintaining the oxidizing reactor at an oxidation temperature where the oxidation temperature is greater than or equal to 640° C.;
    supplying an oxidant gas to the oxidizing reactor, where the oxidizing gas comprises oxygen;
    oxidizing the reduced carrier by contacting the reduced carrier and some portion of the oxygen comprising the oxidizing gas and generating a re-oxidized carrier where the re-oxidized carrier is a solid-state solution having a solvent and a solute where CuO is the solvent and iron oxides are the solute, and where the oxygen carrier comprises greater than 40 wt % CuO and less than or equal to 40 wt % $Fe_2O_3$ on the inert support and where the oxygen carrier has the CuO crystalline structure and the absence of the iron oxide crystalline structures;
    retrieving the re-oxidized carrier from the oxidizing reactor, thereby gathering the oxygen carrier; and
    transporting the re-oxidized carrier from the oxidizing reactor to the fuel reactor, and repeating the delivering the oxygen carrier to the fuel reactor, the mixing the fuel and the oxygen carrier in the fuel reactor, the maintaining the fuel reactor at the reducing temperature of from about 600° C. to about 1000° C., the transferring the reduced carrier from the fuel reactor to the oxidizing reactor, the maintaining the oxidizing reactor at the oxidation temperature, the oxidizing the reduced carrier, and the retrieving the re-oxidized carrier from the oxidizing reactor utilizing the a second portion of fuel as the fuel and the re-oxidized carrier as the oxygen carrier,
thereby conducting the chemical looping process using the oxygen carrier.

* * * * *